INVENTORS
WILLIAM S. FIEDLER
JOHN W. FROST
JOHN M. DIEHL

BY
ATTORNEY

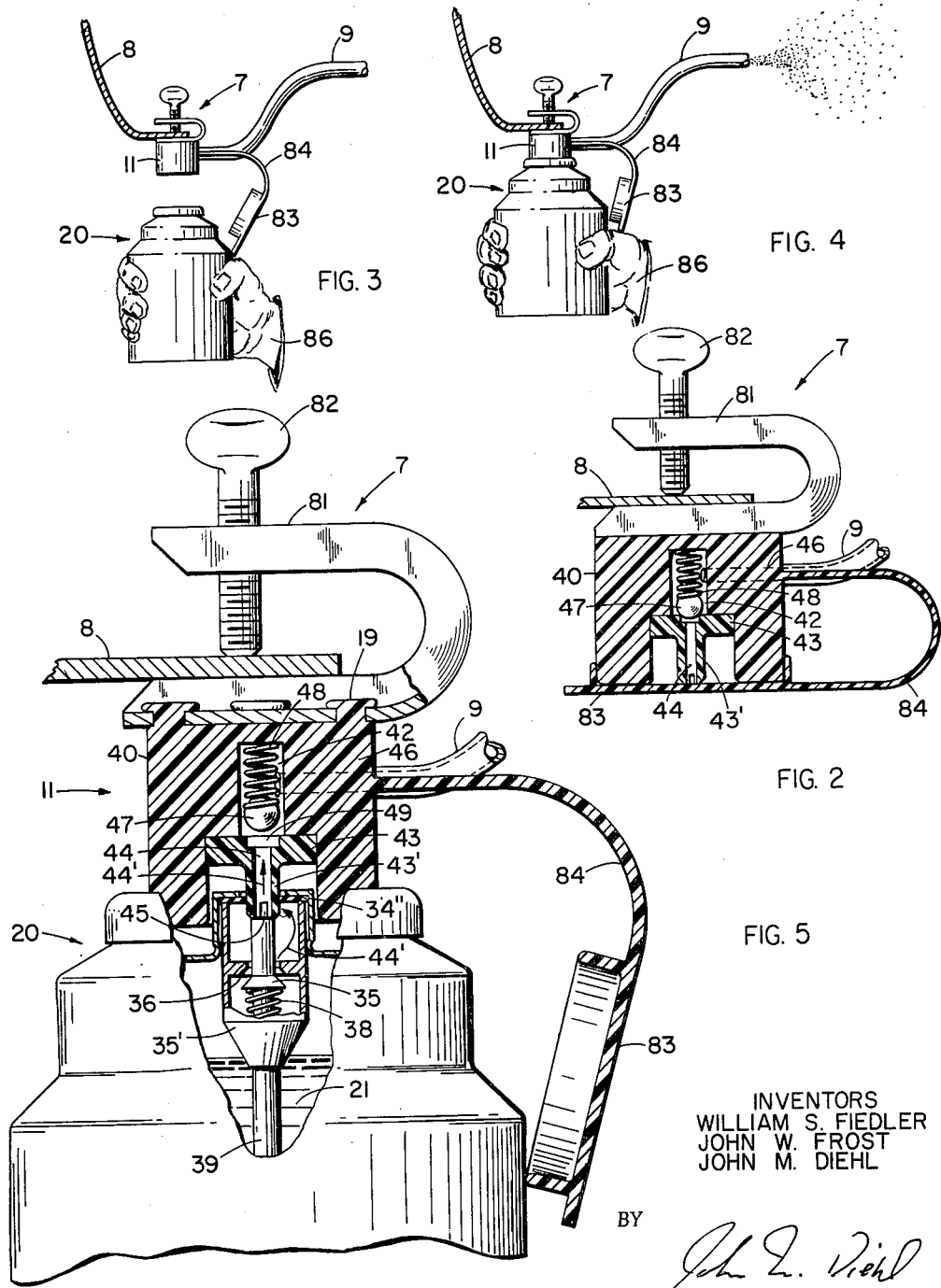

Sept. 14, 1965    W. S. FIEDLER ETAL    3,205,882
INTRODUCING COMBUSTIBLE FLUID TO INTERNAL
COMBUSTION ENGINE AIR CLEANER
Filed Oct. 24, 1963    7 Sheets-Sheet 3

INVENTORS
WILLIAM S. FIEDLER
JOHN W. FROST
JOHN M. DIEHL

BY
*John E. Diehl*
ATTORNEY

FIG. II

Sept. 14, 1965 W. S. FIEDLER ETAL 3,205,882
INTRODUCING COMBUSTIBLE FLUID TO INTERNAL
COMBUSTION ENGINE AIR CLEANER
Filed Oct. 24, 1963 7 Sheets-Sheet 5

INVENTORS
WILLIAM S. FIEDLER
JOHN W. FROST
JOHN M. DIEHL

BY John L. Diehl
ATTORNEY

Sept. 14, 1965  W. S. FIEDLER ETAL  3,205,882
INTRODUCING COMBUSTIBLE FLUID TO INTERNAL
COMBUSTION ENGINE AIR CLEANER
Filed Oct. 24, 1963  7 Sheets-Sheet 6

INVENTORS
WILLIAM S. FIEDLER
JOHN W. FROST
JOHN M. DIEHL

BY *John E. Diehl*

ATTORNEY

United States Patent Office 3,205,882
Patented Sept. 14, 1965

1

3,205,882
INTRODUCING COMBUSTIBLE FLUID TO INTERNAL COMBUSTION ENGINE AIR CLEANER
William S. Fiedler, 5149 Loruth Terrace, Madison, Wis.;
John W. Frost, 512 E. Parkway Blvd., Appleton, Wis.;
and John M. Diehl, 5729 Elder Place, Madison, Wis.
Substituted for abandoned application Ser. No. 129,815,
Aug. 7, 1961. This application Oct. 24, 1963, Ser. No. 323,538
12 Claims. (Cl. 123—187.5)

This application is a substitute for application Serial No. 129,815, filed August 7, 1961, now abandoned, having the same title.

This invention relates to means for introducing combustible fluid from a supply of such fluid into an internal combustion engine having a downdraft carburetor and an air cleaner and more particularly to such means wherein the supply of such fluid is a pressurized dispensing receptacle attached to a suitable fitting. Such fluid may be a conventional fuel such as gasoline or diesel fuel or may be a fluid adapted to deposit a relatively high-temperature, high-pressure lubricant such as molybdenum di-sulfide or colloidal graphite, on the upper cylinder walls, or a fluid containing one or more compositions adapted to dissolve or loosen carbon or sludge within various parts of the engine.

Devices proposed heretofore for this purpose have been relatively complex and relatively difficult to install and to use.

The device of the invention may be installed on a majority of land vehicle engines now in use without the use of any tools whatever and may be used on any other vehicle and stationary engines. It comprises a minimum of parts and may be used with great facility by persons entirely unskilled in the handling, care, maintenance, and repair of internal combustion engines.

In accordance with a preferred embodiment, a stud or threaded rod which projects upwardly from the carburetor barrel in most such engines, and projects through the air cleaner above its top surface is utilized to introduce any such desired fluid into contact with the outer surface of said stud or threaded rod. The fluid flows downward by gravity on the surface of the rod through the space which is normally provided between the surface of the rod and the edge of the hole in the top member of the air cleaner which is conventionally provided; in other words, the threaded rod or stud extends through a hole in the top of the air cleaner, and its fit with this hole is normally very loose. Thus, a space is provided adjacent the surface of the rod through which liquid may flow downwardly. If the fluid is relatively volatile, it may in part flow through said hole as a gas. It may further evaporate off the surface of the rod before reaching the carburetor, and as a gas it is entrained by the air flowing through the air cleaner and drawn into the engine mixed with the air. If the fluid is relatively non-volatile, it flows downward on the surface of the rod as a liquid and drips off the bottom of the rod into the carburetor barrel, where it is normally broken up into small droplets and mixed with the air to an extent quite sufficient to distribute the fluid to all the cylinders in the engine, and, if the fluid is a fuel, to operate the engine.

It is therefore an object of the invention to provide improved means for introducing combustible fluid from a supply of such fluid into an internal combustion engine carburetor.

2

Another object is such a device which will provide improved efficiency and utilization in the engine of fluid introduced through the device.

It is another object to provide such a device which may be installed and operated with relatively great ease, without operation of valves in the engine compartment, and at the same time provide for highly efficient utilization of the fluid introduced through the device.

Other objects will become apparent from the drawings and from the following detailed description on which it is intended to illustrate the applicability of the invention without thereby limiting its scope to less than that of all equivalents which will be apparent to one skilled in the art. In the drawings like reference numerals refer to like parts and:

FIGURE 2 is a partially cross-sectional elevation of a portion of the device of FIGURE 1;

FIGURE 3 is an elevation of the embodiment of FIGURE 2, with the receptacle nearby, just prior to operation of the device;

FIGURE 4 is a view corresponding to that of FIGURE 3, with the device in operation;

FIGURE 5 is a partially cross-sectional partially cut-away view of the embodiment of FIGURE 4;

Figure 1:
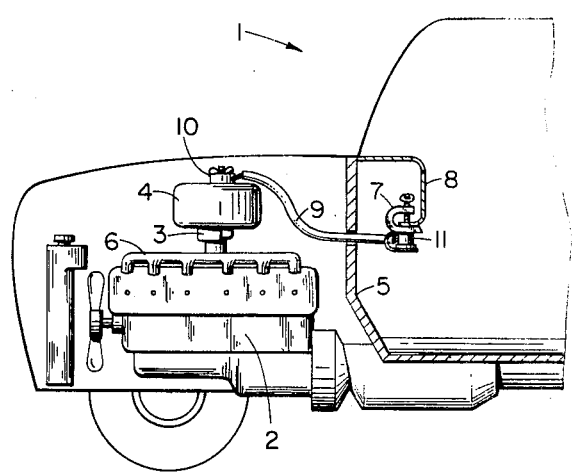
FIGURE 1 is a cross-sectional schematic view of a portion of an automobile provided with an internal combustion engine having the device of the invention applied thereto.

In FIGURE 1 there is shown an automobile indicated generally as 1, having internal combustion engine 2 therein. The invention is equally applicable to such engines which are not in vehicles or are in other vehicles such as boats, aircraft or the like. The engine is fitted with a conventional downdraft carburetor 3 and an air cleaner 4; receiver 11 may comprise clamp 7 which may attach the receiver to dashboard 8 of vehicle 1. Tube 9 leads from receiver 11 to annular member 10 affixed to the top of the air cleaner and may extend through firewall 5 as shown. Engine 2 may be a diesel engine, an engine supplied with fuel-air mixture through a carburetor, a spark-ignition engine, or any other internal combustion engine.

Referring now to FIGURES 2, 3, 4 and 5, there is shown receiving member 11 which, as shown, may be made of metal or of a suitable plastic such as low-density polyethylene, high-density or linear polyethylene, nylon, polypropylene, polycarbonate, or a copolymer of ethylene with any one of several other materials. Receiving member 11 may comprise body 40, and if made of such material, may be fastened to clamp 7 by any suitable means. If body 40 is made of a suitable plastic, it may be fastened to clamp 7 by hot or cold upsetting of portions 19 which may project from body 40. Receiving member 11 also comprises orifice member 43, which is provided with extending cylindrical portion 43'. Portion 43' is hollow inside—that is, it is tubular in form, to provide duct or orifice 44 therewithin, which communicates with a space 42 within body 40, said space being defined by interior wall 41 of body 40. If members 40 and 43 are metal, 43 may be retained in 40 by sweating or soldering or with adhesive. If either member 40 or 43 is of plastic, member 43 is preferably retained in member 40 by use of an interference fit so that placing the two members into the position shown in the figures results in sufficient deformation of each of the members, so that they cannot be taken apart, except with great difficulty. There is preferably provided within space 42 a check valve which may comprise ball 47 biased by coil spring 48 against seat 49 provided in member 43. A passage 46 is provided within body 40, extending from space 42 through inner wall 41 and through the outer wall of body 40 to communicate with the interior of tube 9, so that fluid entering space 42 through duct 44 may leave through passage 46 and through tube 9. The clamp indicated generally as 7, may comprise frame member 81 and thumbscrew 82, which may be operated to attach receiver 11 to dashboard 8. Receiver 11 may be provided with cap 83, which may be a very light press fit with the lower portion of body 40 so that, as shown in FIGURE 2, the cap may be engaged with body 40 frictionally and may be then removed from body 40 to the positions shown in FIGURES 3, 4 and 5, by simply pulling downward on the cap. Cap 83 is preferably attached to body 40 by integral resilient member 84, which acts as a hingeable connection to permit installation and withdrawal of the cap with a maximum of ease. Both low-density polyethylene and linear polyethylene have been found suitable as materials of which body 40, member 42, and cap 83 may be made as a single integral unit.

Pressurized valved receptacle 20 may be held in operator's hand 86 and forced upwardly into engagement with receiver 11, as shown in FIGURES 3 and 4, so that receiver 11 and receptacle 20 are engaged as shown in FIGURE 5. After receptacle 20 is engaged with receiver 11 as shown in FIGURES 4 and 5, it may be removed, by pulling downward with hand 86. Such engagement and removal by translatory motion of receptacle 20, as indicated in FIGURES 3 and 4 may be repeated as many times as necessary or desired, effectively until receptacle 20 is empty. As will be desired hereinafter, such translatory motion is preferably substantially on the axis of orifice 44.

Receptacle 20 preferably contains combustible fluid 21 which may be a conventional fuel such as gasoline, to be utilized in case the regular supply of such fuel contained in the gasoline tank in an automobile for example becomes exhausted. Thus an emergency supply of gasoline may be provided in receptacle 20 which is sufficient to run an automobile from 1 to 4 miles to make it possible to reach a place where additional gasoline may be obtained.

Fluid 21 may alternatively be a compound adapted to provide improved lubrication in various parts of the engine, for example, the cylinders and pistons, which may have any composition proposed for this purpose and need not be entirely combustible; such a fluid may, for example, be colloidal graphite or molybdenum disulfide or both, suspended in kerosene or some other mixture of somewhat volatile organic liquids. Fluid 21 may alternatively be a liquid of any suitable composition for removing gum or carbon or other deposits from various portions of the interior of the engine. Especially suitable for the use in the invention, for example may be fluid adapted to dissolve and remove gum deposits from the interior of the carburetor. Any of the aforesaid liquids or combinations of them is maintained under pressure by additionally introducing into the receptacle a fluid adapted to provide such pressure. The fluid may be a gas such as nitrogen or may be a fluid which under the pressure provided in the container is normally liquid at room temperature, such as, for example, butane, $CO_2$, nitrous oxide or certain halogenated hydrocarbons of relatively low molecular weight, especially those sold by the DuPont Company under the tradename "Freon." Fluid 21 is in most cases combustible and is described hereinafter as combustible but need not be at all combustible if it has utility in the engine. For example, it may be a halogenated hydrocarbon analogous to carbon tetrachloride which acts to clean certain deposits from interior portions of the engine, it being necessary to the utilization of such non-combustible liquid that one or more of the orifices described hereinafter be sufficiently small to cause enough normal fuel to enter carburetor 3 to cause the engine to continue operating despite simultaneous introduction of such noncombustible liquids at a relatively low flow rate.

Receptacle 20 contains valve 35' having member 35" which seats on seat 36; it also comprises sealing washer 34" of elastomeric material. Cylindrical member 43' is provided with one or more notched passageways 45. When receptacle 20 and receiver 11 are engaged as in FIGURES 4 and 5, the interior edge of sealing member 34", which provides a dispensing orifice for receptacle 20, is in sealing engagement with the outer surface of cylindrical member 43' to prevent passage of fluid therebetween, and the end of member 43' presses downward on valve member 35, which is biased upwardly by spring 38, so that valve member 35 is forced off of seat 36 and fluid may pass upward from dip tube 39 into space 42 as shown by arrows 44'.

It may be seen that when receptacle 20 and receiver 11 are engaged as in FIGURES 4 and 5, orifice 44 and the orifice provided by sealing member 34" are in sealed engagement, so that fluid passes upward through the outlet duct provided in receptacle 20 around spring 38 and between valve member 35 and seat 36 and along the upper stem of member 35, thence through passage 45 and duct 44 into space 42, as shown by arrows 44', and cannot pass outward or escape from the device since the orifice members are in sealed engagement; that is, orifice member 43 is in sealed engagement with the dispensing orifice of receptacle 20 provided by member 34".

Figure 19:
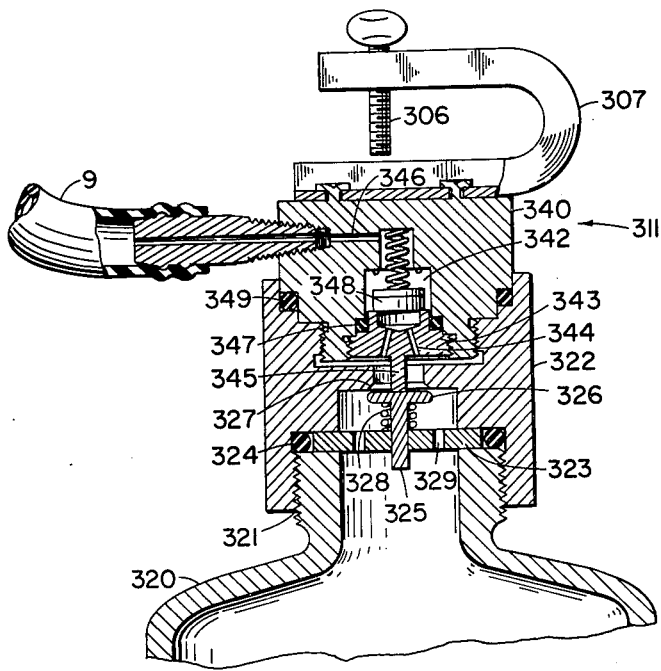
FIGURE 19 is a cross-sectional partially cut-away view of another modification of a portion of the apparatus of FIGURE 1.

In FIGURE 19 there is shown a receiver 11 respectively which may be utilized to attach to a dashboard, by means of clamp 307 or 357 respectively, a relatively large heavy walled receptacle 320 such as is most usually utilized to contain or be pressurized with propane or $CO_2$.

As shown in FIGURE 19, clamp 307 may be attached to a dashboard by operation of thumbscrew 306; attached to clamp 307, there may be provided body 340 of receiver 311 which may be provided with interior space 342 having passage 346 leading therefrom to the interior of tube 9. Attached to the top of receptacle 320 there may be provided a closure member 322 which may contain a valve member 325 having sealing portion 326 adapted to seat against seat 327. Compression spring 328 may act against spring retainer and spacer member 323 to bias valve member 325 upwardly to cause portion 326 to seat against seat 327. Closure 322 may be threadedly engaged with the top of receptacle 320 at 321 to retain thereinbetween spacer 323 with a sealing member such as O-ring 324 disposed to seal the connection between closure 322 and receptacle 320. To retain receptacle 320 in connection with receiver 311, closure 322 may be threadedly engaged with body 340 as shown and may be sealed thereto with a sealing member such as O-ring 349. Threadedly attached to body 340 there may be provided orifice member 343, having downwardly projecting member 345 and sealing member such as O-ring 347 to seal the connection between it and body 340. Member 343 may be provided with a plurality of tubular ducts or passages 344 extending upwardly from its lower surface to communicate with a single aperture immediately below a check valve indicated generally as 348 which may be contained in space 342. It may be seen that as closure 322 is screwed onto body 340 it is sealed thereby by O-ring 349 and at the same time member 345 extends downwardly to press against valve 325 to lift it off seat 327 and allow the fluid to flow upwardly from receptacle 320 through holes 329 and thence through holes 344, space 342 and passage 346 to tube 9. The embodiment of FIGURE 19 is particularly suitable for introducing gas from container 320 to tube 9 but may be suitably adapted by provided a dip tube therein, to dispense liquid upwardly from the bottom of receptacle 320 and thence to tube 9.

The fluid flowing from receiver 11 may be introduced into the engine from tube 9, as shown in FIGURE 1, through member 10 or modifications thereof as described hereinafter.

Figure 6:
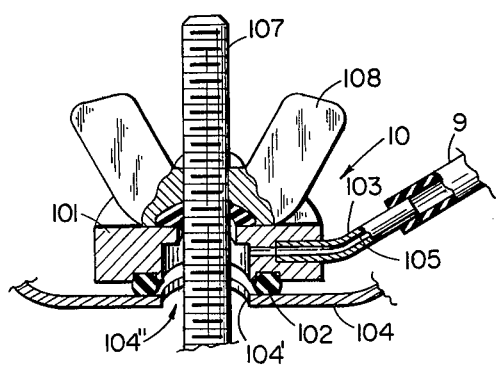
FIGURE 6 is a cross-sectional perspective view of member 10 shown in FIGURE 1.
Figure 11:
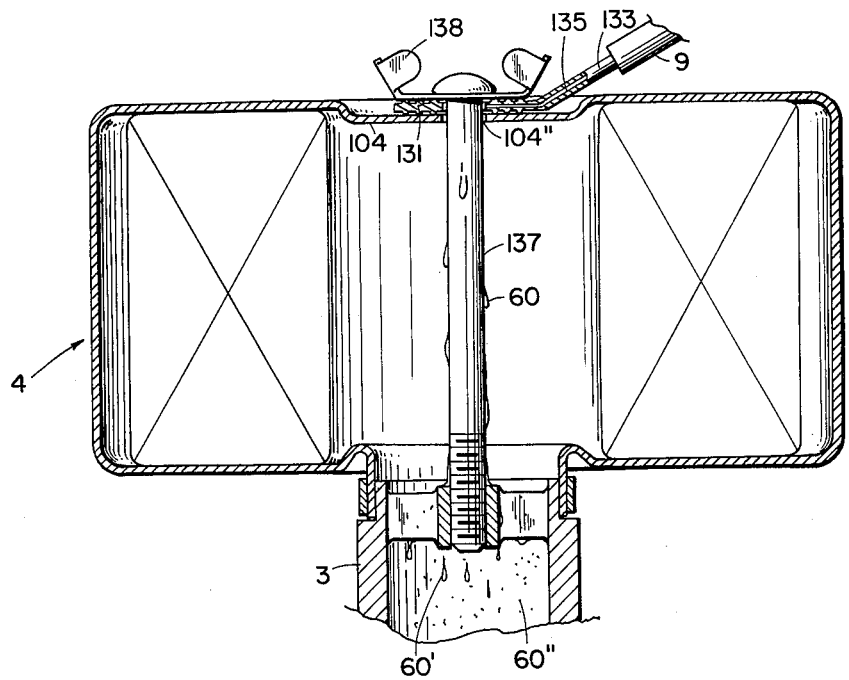
FIGURE 11 is a cross-sectional view showing application of the embodiment of FIGURE 9 to an air cleaner.
Figure 12:
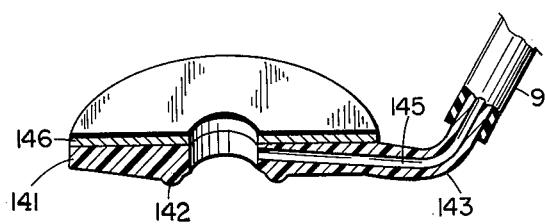
FIGURE 12 is a cross-sectional perspective view of another modification of member 6.
Figure 15:
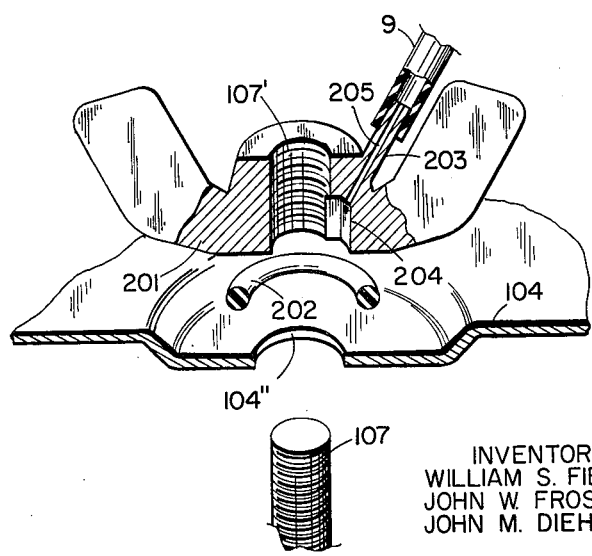
FIGURE 15 is a cross-sectional perspective "blown-apart" view of an embodiment which may be utilized in place of member 6.

Referring now to FIGURES 6, 1 and 15, annular device 10 may be applied to the top 104 of air cleaner 4, as shown for member 10 in FIGURES 1 and 6 and member 131 in FIGURE 11.

Member 10 may comprise annular washer-like body 101 and gasket 102 and tube 103. It may surround threaded rod 107 which extends upwardly through top 104 of air cleaner 4 and be held in place by wing-nut 108 threaded on rod 107, which attaches the air cleaner to carburetor 3 as indicated in FIGURE 15. Passage 105 is provided in body 101 and the interior of tube 103 to provide for fluid flow from tube 9 to the interior of body 101, where the fluid may contact the surface of rod 107 and flow downwardly through space 104" provided between the outer surface of rod 107 and the inner edge 104' of the hole in top 104 through which rod 107 extends.

Figure 7:
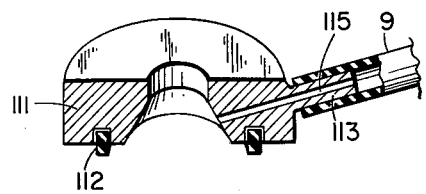
FIGURE 7 is a cross-sectional perspective view of a modification of the embodiment of FIGURE 6.

The annular member shown in FIGURE 7 may be utilized in place of and in the same member as member 10. It may comprise body 111, gasket 112, and extending portion 113 of body 111 with duct 115 extending from the interior of body 111 through part 113 to communicate with tube 9.

Figure 8:
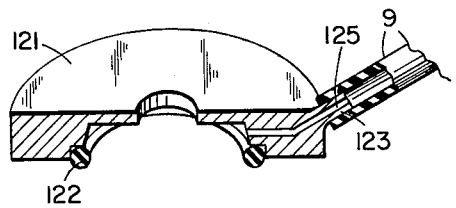
FIGURE 8 is a cross-sectional perspective view of a modification of the embodiment of FIGURE 6.

Another annular member which may be used in place of and in the same manner as member 10 is shown in FIGURE 8; it may comprise body 121, sealing gasket 122, extending portion 123 of body 121, and passage 125 extending through body 121 from the interior thereof and thence through extending portion 123 to communicate with tube 9.

In the devices of FIGURES 6, 7 and 8, the upper surface of each of bodies 101, 111, and 121 respectively seats against the lower surface of nut 108 with sufficient tightness to prevent escape of fluid therethrough, and the engagement of the threads of nut 108 with the threads of rod 107 is sufficiently tight to prevent escape of fluid therethrough. Thus, fluid reaching the interior of bodies 101, 111, and 121 can flow substantially only downward through space 104", because each of sealing members 102, 112 or 122 seals the space between the bottom of body 101, 111 and 121 respectively and top 104.

Figure 9:
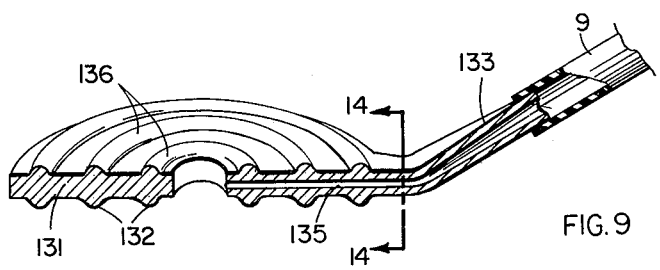
FIGURE 9 is a cross-sectional perspective view of another modification of the embodiment of FIGURE 6.
Figure 10:
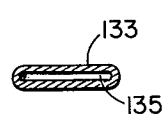
FIGURE 10 is a cross-sectional view taken on lines 14—14 in FIGURE 9.

As shown in FIGURES 9, 10 and 11, member 131, having extending portion 133, may be used in place of and in the same manner as member 10. Body 131 is provided with passage 135 extending from the interior thereof outwardly through extending portion 133 to provide communication between the interior thereof and tube 9 and is provided with downwardly extending ribs 132 and upwardly extending ribs 136 to provide a seal respectively with top 104 and member 138 as shown in FIGURE 15.

Further, as shown in FIGURE 11, rod 137 may be utilized in place of rod 107, and member 138 may be a nut corresponding to 108 threaded onto threads at the top of rod 137 or may, as shown in FIGURE 15, comprise a head securely attached by any suitable means, such as welding, to 137, which may thus constitute a stud or bolt which threadedly attaches air cleaner 4 to downdraft carburetor 3.

In some land vehicles, air cleaners are provided in which the filtering or cleaning element is alongside or below the carburetor and at one side of the carburetor and an air duct extends from above the air cleaner to above the carburetor, where it is attached to the top of the carburetor in the same manner as shown for an entire air cleaner in FIGURE 1, 10 or 15, that is, by a threaded rod extending upward from the carburetor through a top portion of the duct portion of the air cleaner. The invention is equally suitable for application to an engine having an air cleaner and downdraft carburetor arranged in such a manner.

Referring again to FIGURE 15, fluid passing from tube 9 through passage 135 may pass downward through space 104" and then if in the form of liquid 60, may run down the sides of rod 137 and thence drip into the carburetor barrel as shown at 60' or, if a gas, may pass downward through space 104", thence be mixed with air in the air cleaner, and thence pass into the carburetor barrel as shown at 60". Also, liquid 60 may evaporate from the side of rod 137 to provide gaseous fluid 60'.

Figure 16:
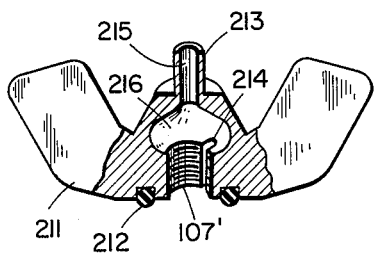
FIGURE 16 is a cross-sectional perspective view of a modification of the embodiment of FIGURE 15.

In FIGURE 16 there is shown another device which may be used in place of and in the same manner as member 10, wherein body 141 is provided with sealing projection or rib 142, extending portion 143 adapted to receive tube 9, passage 145 extending from the interior of body 141 through portion 143 to communicate with the interior of tube 9, and back-up member 146 which may have the form of a metal washer. The upper surface of member 146 may be in sealing engagement with a nut such as 108 and portion 142 is preferably adapted to seal with the upper surface of air cleaner top 104.

Figure 13:
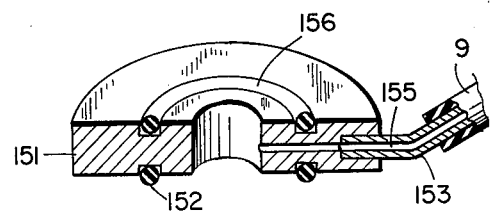
FIGURE 13 is a cross-sectional perspective view of another modification of the embodiment of FIGURE 6.
Figure 14:
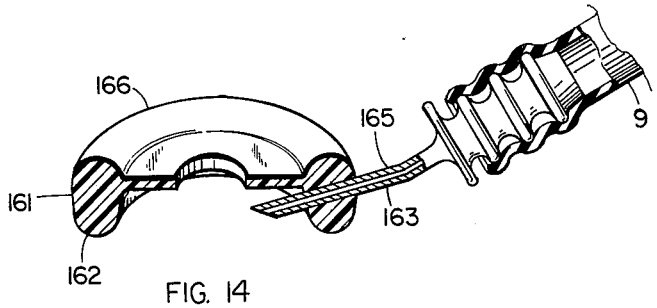
FIGURE 14 is a cross-sectional perspective view of still another modification of the embodiment of FIGURE 6.

As shown in FIGURE 13, a device which may be utilized in place of and in the same manner as member 10 may comprise body 151, tube 153, lower sealing member 152 to seal with top 104, and upper sealing member 156, which may have the form of an elastomeric O-ring and seal with the lower surface of nut 108. Tube 153 may extend outwardly to receive tube 9 and passage or duct 155 may extend outwardly from the interior of body 151 through the interior of tube 153 to communicate with the interior of tube 9.

Figure 18:
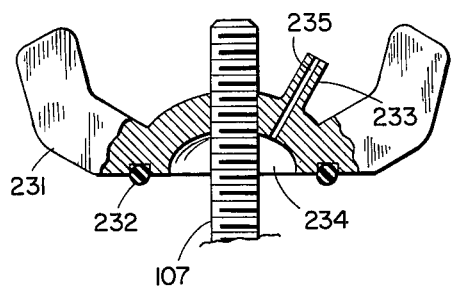
FIGURE 18 is a cross-sectional view of another modification of the embodiment of FIGURE 15.

Another device which may be utilized in place of and in the same manner as member 10 is shown in FIGURE 18 wherein body 161 has lower sealing surface 162 (to seal with top 104) and upper sealing surface 166 (to seal with nut 108) and is provided with a metal tubular member 163 extending from the interior thereof outward to receive tube 9, as shown, member 163 having passage 165 in the interior to communicate from the interior of member 161 to the interior of tube 9.

Bodies 101, 111, 121 and 151 may be made preferably of metal or of a relatively rigid plastic such as nylon, polycarbonate, polypropylene, or high-density polyethylene, or usefully may be made of a softer plastic such as low-density polyethylene. Bodies 131, 141, and 161 are preferably made of a relatively more resilient, less hard plastic such as low-density polyethylene, plasticized polyvinylchloride, or the like, or, may usefully be made of even softer and more resilient material, such as an elastomer, such as natural rubber, GR–S, GR–N, or like material of which those which are preferred are those which are most resistant to hydrocarbons, such as a sulphur-containing elastomeric material sold under the trade name Thiokol. Sealing members 102, 112, 122, 152 and 156 are preferably made of such softer and more resilient materials as are useful for bodies 131, 141 and 161.

In FIGURE 15, there is shown a device which may be utilized in place of both member 10 and nut 108. The functions of both nut 108 and body 101 and tube 103 are combined in member 201, which may have the outward appearance of a wing nut, as shown, and may be provided with a central threaded hole 107″ to engage the threads of rod 107, cut-away portion 204 adapted to be adjacent the surface of rod 107, extending portion 203, and passage or duct 205 extending from portion 204 through body 201 and portion 203 to communicate with tube 9. It may be provided with sealing member 202 to seal the undersurface of member 201 to the top of air cleaner top 104. Fluid from tube 9 may flow through passage 205, thence through cut-away portion 204 and thence downward through space 104″.

In place of members 201 and 202 of FIGURE 15 there may be utilized in the same manner the device shown in FIGURE 16 wherein body 211 has the outward form of a wing nut, and has a threaded central interior portion to engage the threads of rod 107, a sealing member 212, extending portion 213, cutaway hollow interior portion 216, cutaway portion 214 adjacent threads 107″, and passage 215 extending from portion 216 through tube member 213 to communicate with tube 9. Fluid may flow through passage 215, thence through portion 216, thence through passage 214,, and thence through space 104″.

Figure 17:
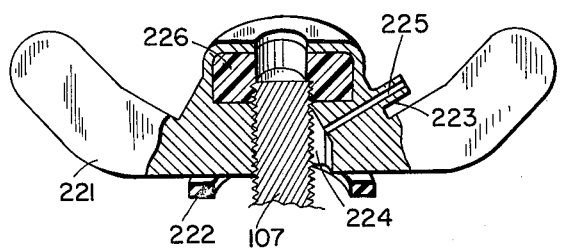
FIGURE 17 is a cross-sectional perspective view of a modification of the embodiment of FIGURE 15.

Another device which may be used in place of that of FIGURES 15 and 16 is shown in FIGURE 17 wherein body 221 has the outward form of a wing nut and is provided with a threaded interior central portion which is shown as being engaged with the threads of rod 107, cutaway space 224 in the interior of body 221 communicating with threads of rod 107, extending portion 223, and passage 225 extending from cutaway space 224 outwardly through the interior of extending portion 223 to communicate with tube 9. Sealing member 222 may be provided to seal the space between the bottom surface of member 221 and top 104. The upper portion of body 221 is provided with resilient, somewhat elastomeric material 226 in a manner which is conventional with devices sold as "elastic stop nuts" to cause the nuts to be retained on threaded bolts or rods so that lock washers are not necessary.

In FIGURE 18, there is shown another device which may be used in place of and in the same manner as 201, which comprises body 231 fitted with sealing member 232 and provided with outwardly extending portion 233, cutaway space 234 in the interior adjacent the threads of rod 107, and duct 235 extending from cutaway portion 234 outwardly through body 231 and thence through extending portion 233 to communicate with tube 9.

To prevent escape of fluid which flows from tube 9 through any one of passages 205, 215, 225 or 235, means are provided to prevent such escape between bodies 201, 211, 221 and 231 respectively, and top 104, such means being sealing members respectively 202, 212, 222 and 232. In the devices of FIGURES 19 and 22, a tight fit between threads of rod 107 and the threads of bodies 201 and 231 which engage the threads of 107 is relied upon to prevent upward escape of fluid along the threads of rod 107. In body 211, such upward escape is prevented by reason of the fact that rod 107 does not extend entirely through the device; in body 221, means to prevent such escape is provided by elastomeric member 226, which is in sealing engagement with the upper threads of rod 107.

It may be noted that tube 9 has no valve in it. It may also be noted that the receptacle in all embodiments is provided with a valve; in preferred embodiments such valve is opened and maintained open by a member which is part of the receiver.

It may thus be seen that the invention is broad in scope and includes such modifications as will be apparent to those skilled in the art and is to be limited only by the claims.

Having thus described our invention, we claim:

1. In combination with an internal combustion engine, a downdraft carburetor, an air cleaner passage above said carburetor, said air cleaner passage having a top portion, a rod extending upwardly from said carburetor through said top portion, the upper end of said rod being threaded, threaded means threadedly engaged with said rod and acting downwardly on said top portion to retain it above said carburetor, the combination of a supply of combustible fluid and means for introducing said fluid into said engine, comprising: a substantially annular means surrounding said rod, said means provided with inlet duct means leading from said supply of fluid, means communicating with said inlet duct means and with the outer surface of said rod to bring said fluid into contact with the outer surface of said rod and to cause it to flow downward in contact with the outer surface of said rod into said carburetor and thence into said engine.

2. The device of claim 1 wherein a nut threadedly engages said threaded rod, an annular member is disposed around said rod in substantially sealing engagement with the bottom surface of said nut and in substantially sealing engagement with the top of said air cleaner and has an outer wall and a substantially circular inner wall, and said duct means extends from said outer wall to said inner wall.

3. The device of claim 1 wherein said annular member is provided with a threaded cylindrical inner wall which threadedly engages said threaded rod and with an outer wall and a bottom surface in sealing engagement with the top of said air cleaner, and said inner wall is provided with a space in a cut-away portion adjacent the threads of said rod and adjacent the top of said air cleaner, and said duct means extends from said outer wall to said space.

4. The device of claim 2 wherein said annular member comprises a relatively rigid annular portion through which said duct means extends and an annular sealing ring engaged with the lower portion of said annular portion.

5. The device of claim 2 wherein said annular member comprises a plastic member having a plurality of upwardly extending annular projections and a plurality of downwardly extending annular projections.

6. The device of claim 2 wherein said annular member comprises a flat metal washer having a layer of plastic adjacent its bottom surface, said plastic layer comprising an annular projecting portion extending downward from its lower surface.

7. The device of claim 2 wherein said annular member comprises a resilient toroidal portion having a flat thin portion extending inward from its inner surface and a metal tube extending laterally through the toroidal portion.

8. The device of claim 3 wherein said annular member is provided with two oppositely extending wing-nut portions.

9. The device of claim 3 wherein said annular member is provided with a resilient annular sealing portion in sealing engagement with the threads of said rod.

10. The device of claim 3 wherein said cutaway space in said annular member is above the end of said rod and comprises a passage extending longitudinally downward alongside the threads of said rod and said duct means extends upwardly above the end of said rod.

11. The device of claim 3 wherein said space extends entirely around said rod.

12. The device of claim 3 wherein said space extends only partially around said rod.

References Cited by the Examiner

UNITED STATES PATENTS

| | | | |
|---|---|---|---|
| 1,004,359 | 9/11 | Brown | 123—187 |
| 2,628,634 | 2/53 | Glover | 123—180 |
| 2,639,702 | 5/53 | Morde | 123—180 |
| 2,708,922 | 5/55 | Neely | 123—187.5 |
| 2,731,250 | 1/56 | Yon | 123—180 |
| 2,851,027 | 9/58 | Kivels | 123—187.5 |
| 2,948,595 | 8/60 | Orr | 44—52 |

FOREIGN PATENTS 772,490  4/57  Great Britain.

RICHARD B. WILKINSON, *Primary Examiner.*